United States Patent [19]

Buff, Jr.

[11] 4,182,462
[45] Jan. 8, 1980

[54] SANITARY CONTAINER

[76] Inventor: George J. Buff, Jr., Kresson Rd. and N.J. Turnpike, Cherry Hill, N.J. 08034

[21] Appl. No.: 654,024

[22] Filed: Jan. 30, 1976

Related U.S. Application Data

[63] Continuation-in-part of Ser. No. 393,445, Aug. 31, 1973, abandoned, and a continuation-in-part of Ser. No. 581,824, May 29, 1975, abandoned.

[51] Int. Cl.² ............................................. B65D 23/02
[52] U.S. Cl. .................................... 220/450; 220/406; 220/453; 220/460
[58] Field of Search .......... 229/1.5 R, 2.5 R, 3.5 MF, 229/14 R, 14 BE; 220/63 R, 65, 70; 119/61; 206/499, 503, 505, 515, 518; 426/115; 99/416, 448

[56] References Cited

U.S. PATENT DOCUMENTS

| | | | |
|---|---|---|---|
| 71,565 | 11/1867 | Woodworth | 220/70 |
| 730,082 | 6/1903 | Bates | 220/65 |
| 2,007,523 | 7/1935 | Emery | 229/2.5 X |
| 2,053,949 | 9/1936 | Emery | 229/2.5 R |
| 2,542,413 | 2/1951 | Ibsch, Jr. | 220/65 |
| 3,362,604 | 1/1968 | Lagostina | 220/65 X |
| 3,430,803 | 3/1969 | Nelson | 220/63 R |
| 3,514,012 | 5/1970 | Martin | 220/63 R |
| 3,527,192 | 9/1970 | Ferrara | 119/61 |
| 3,622,036 | 11/1971 | Bongaerts | 220/70 |
| 3,698,594 | 10/1972 | Boehlert | 119/61 X |

FOREIGN PATENT DOCUMENTS

| | | | |
|---|---|---|---|
| 233673 | 5/1961 | Australia | 220/65 |
| 1253019 | 12/1960 | France | 229/2.5 R |
| 896830 | 5/1962 | United Kingdom | 220/70 |

Primary Examiner—Stephen Marcus
Attorney, Agent, or Firm—Robert K. Youtie

[57] ABSTRACT

The invention is concerned with sanitary containers adapted for repeated re-use without the need for cleaning between usage, wherein a plurality of thin recessed layers are closely nested with respect to each other, with the exposed layer separable from the remaining layers after each use to thereby present a fresh layer for the next use.

7 Claims, 4 Drawing Figures

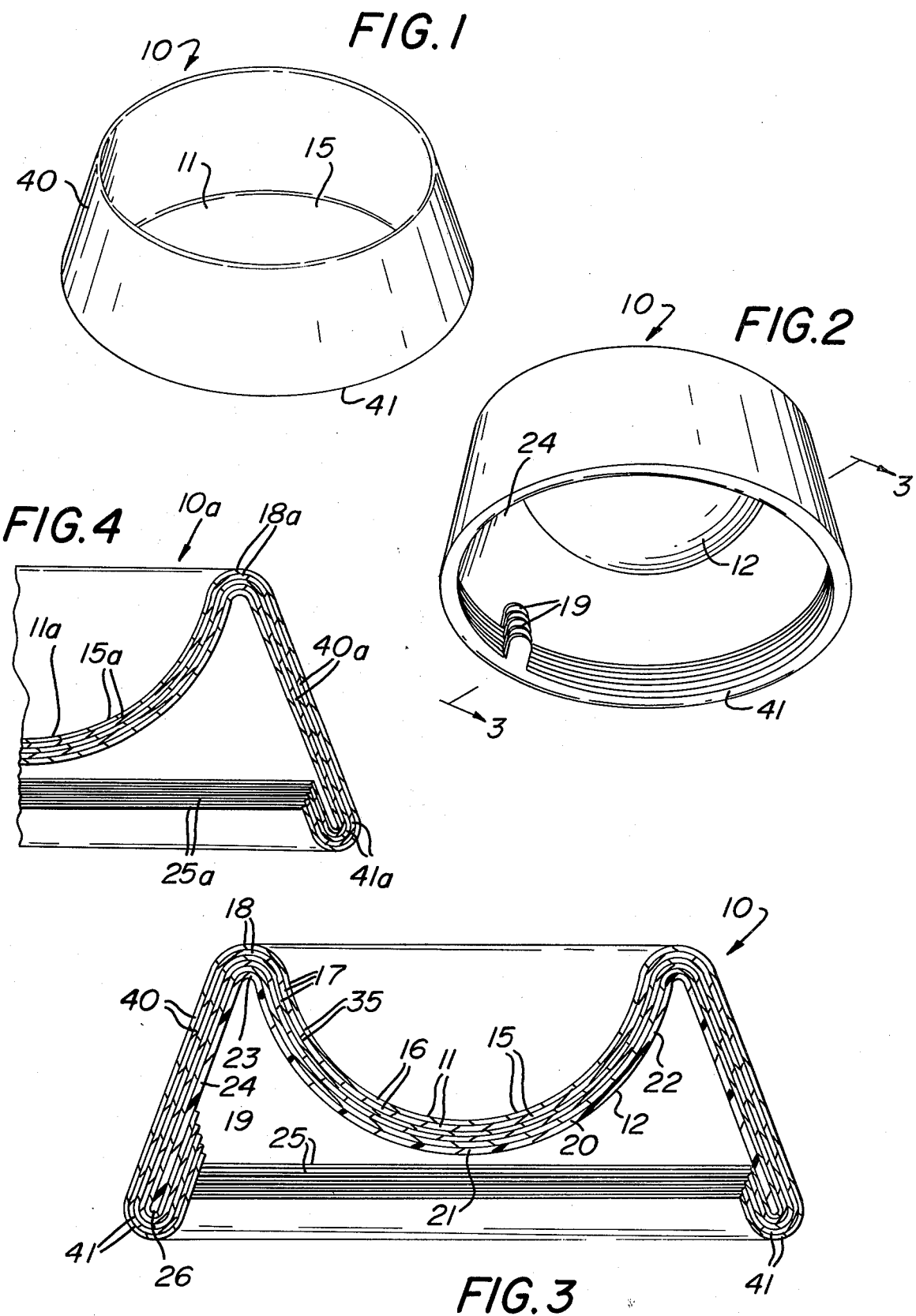

SANITARY CONTAINER

CROSS-REFERENCES TO RELATED APPLICATIONS

This application is a continuation-in-part of my copending patent applications Ser. No. 393,445, filed Aug. 31, 1973, now abandoned, and Ser. No. 581,824, filed May 29, 1975, now abandoned.

BACKGROUND OF THE INVENTION

As is well known, sanitary conditions often require washing, scrubbing, sterilizing or other cleaning of containers, say food containers between successive uses, say in the distribution, preparation or service of food, and the like. While there have, in the past, been provided disposable or throw-away containers or receptacles for single usage, these prior devices have not been entirely satisfactory, often occupying excessive space in storage, being subject to contamination before use, and otherwise lacking convenience under practical conditions.

SUMMARY OF THE INVENTION

It is, therefore, an important object of the present invention to provide a container of the type described which overcomes the above-mentioned difficulties, automatically presenting for each use a fresh and sanitary recessed surface, occupying a minimum of space both in storage and use, and achieving substantial economies in manufacture, distribution and sale so as to effect substantial savings in cost to the user.

It is a further object of the present invention to provide a container having the advantageous characteristics mentioned in the preceding paragraph which is capable of a wide variety of embodiments and modifications, say in the manufacture or preparation of foodstuffs, the distribution and service of the same, as well as other similar uses.

It is still another object of the present invention to provide a container of the type described above which is uniquely well adapted for use on a floor or ground surface, as in animal or pet feeding, wherein any contamination of the container by contact with the floor or ground surface is automatically removed and an entirely clean surface, free of contamination is presented upon mere removal of an outer, previously exposed layer.

Other objects of the present invention will become apparent upon reading the following specification and referring to the accompanying drawings, which form a material part of this disclosure.

The invention accordingly consists in the features of construction, combinations of elements, and arrangements of parts which will be exemplified in the construction hereinafter described and of which the scope will be indicated by the appended claims.

BRIEF DESCRIPTION OF THE DRAWINGS

FIG. 1 is a top perspective view showing a sanitary container constructed in accordance with the teachings of the present invention.

FIG. 2 is a bottom perspective view of the sanitary container of FIG. 1.

FIG. 3 is a sectional elevational view taken generally along the line 3—3 of FIG. 2.

FIG. 4 is a partial sectional elevational view similar to FIG. 3, but showing another slightly modified embodiment.

DESCRIPTION OF THE PREFERRED EMBODIMENTS

Referring now more particularly to the drawings, and specifically to FIGS. 1 and 2 thereof, a container of the present invention is there generlaly designated 10, and may include a multitude or plurality of recessed layers 11 in superposed or nested relation with respect to each other. Further, a support member or holder 12, see FIGS. 2 and 3, is conformably disposed in supporting relation with the stack of superposed layers 11.

More specifically, the several superposed layers 11 may each be fabricated of any suitable material, say plastic film or sheets, paper or treated paper, thin metal or foil, or the like. In particular, it has been found advantageous to fabricate the layers 11 of aluminum foil of suitable thickness, say from 0.0001 inches to 0.010 inches, being selected of a suitable gauge for durability and economy compatible with the desired end use.

As best seen in FIG. 3, each layer 11 may be substantially identical and formed with a central dished portion, concavity or recess 15 having a bottom wall or region 16, and a circumferential side wall region 17. The bottom wall region 16 of each recess 15 may be upwardly concave or of other suitable configuration, and the side wall region 17 may advantageously flare or expand in the upward and outward direction. Viewed otherwise, the side wall regions 17 of the recessed layers or sheets 11 each converge or taper downwardly or inwardly. By this essentially identical recessed configuration of each layer 11, the recessed portions thereof are in substantially complete or entire conforming surface engagement with each other, and further the upwardly divergent side wall regions 17 may nest in a self-retaining wedging engagement in the manner of a taper fit. Thus, the recessed layers, by the recess of each layer, defines a receptacle, with the several receptacles in superposed facing engagement with each other over substantially their entire surface areas. By this surface engagement between adjacent superposed layers, the layers may be releasably retained in position by the adherent effect of the interface surface engagement, without benefit of the tapered wedge action.

Further, the several layers 11 may have interposed therebetween suitable adhesive means, as at 35, adhesively securing together the layers. That is, each layer is secured by the interposed adhesive 35 in facing engagement with the next adjacent upper and lower layers. The adhesive 35 may or may not cover the entire surface of its respective layer 11, as desired, and may advantageously be more adherent to the underside of the adjacent upper layer than to the upper side of the adjacent lower layer. By this arrangement, the separation or removal of the uppermost layer 11 will remove therewith the adhesive on the underside thereof and leave exposed a fresh and clean upper surface of the next adjacent lower layer.

The recessed layers 11 may further include transversely arcuate upwardly convex peripheral portions 18 depending exteriorly and flaring outwardly as at 40. That is, the several layers 11 include outer circumferential or peripheral portions 40, which may be generally frusto-conical in configuration and extend in facing engagement with each other. Additionally, the outer layer portions 40 depend to lower regions and there curve inwardly to extend in conforming engagement beneath each other, as at 41 to define downwardly convex peripheral portions or margins extending upwardly and interiorly to their circumferential edges 25. At a selected location along interior edges 25 of peripheral portions 41, there may be provided fingerpulls or tabs 19 upstanding interiorly from the edges.

Disposed in supporting engagement with the underside of the lowermost or innermost layer 11 is a lower or inner holder or support 12, which may advantageously be conformably configured for surface engagement over substantially the entire area with the lowermost layer. In particular, the lower holder or support 12 may include a recess 20 having a central lower or bottom region 21 and a peripheral, upstanding or outstanding wall 22, which may flare upwardly or outwardly from the bottom wall portion. The holder recess 21 thus defines a receptacle conformably receiving the stack of layers 11, and is further formed at the upper extremity of the side wall 22 with a peripherally extending reversely bent upper region 23 which conformably supports and engages beneath the lowermost peripheral, convexly arcuate portion 18. In addition, the support or holder 20 may be provided with a depending outer wall 24 extending downwardly from the transversely arcuate upper region 23 for facing engagement with the innermost peripheral layer portion 40 to a lower extremity or edge 26 terminating within the innermost, downwardly arcuate peripheral portion 41. Thus, the holder or support 12 serves to reinforce or stiffen the stack of layers 11 permitting use of relatively thin layers and successive use of the layers upon sequential removal of the uppermost layer. The holder or support 12 may be secured to the stack of layers 11, say to the innermost layer, as by the hereinbefore described wedge action, or interface surface engagement, or other suitable means, or lack securement thereto, if desired.

Thus, in the embodiment shown in FIGS. 1-3, the entire exposed or external surface of the container 10 is effectively removed and replaced upon removal of the outer layer 11. By mere fingerpull of the tab 19 of outermost layer 11, the arcuate portion 41 is disengaged from beneath the assembly, and the side portion 40 is subsequently disengaged, while continued pull effects complete separation of the outermost layer from the remainder of the assembly.

There is thus obtained the complete coverage of all surfaces subject to contamination and complete renewal of all such surfaces upon each subsequent usage. For example, in the use of container 10 as a pet or animal feeding container on a floor or ground surface, contamination by contact of the outer, downwardly facing surface of outermost arcuate portion 41 is automatically removed by peeling or removal of the outer layer, to expose the next adjacent inner layer.

While the embodiment of FIGS. 1-3 may show the inclusion of an inner relatively rigid holder or support 12, it is appreciated that the embodiment is capable of use without such support, as in the embodiment of FIG. 4. It is there seen that the layers 11a are each essentially similar to the hereinbefore described layers 11 and there are provided a plurality superposed on each other in the same manner as the layers 11. In particular, the layers 11a may each be identical to each other, being centrally recessed, as at 15a, with the centrally recessed regions nested or stacked with their entire surfaces in superposed facing engagement with each other. Further, the recessed layers 11a may each include a transversely arcuate, upwardly convex peripheral portion 18a, corresponding to the hereinbefore described portions 18. Depending exteriorly and flaring outwardly from each upper peripheral portion 18a is an outer circumferential or peripheral portion 40a, corresponding to the hereinbefore described portions 40, which depend to lower regions and there curve inwardly in conforming engagement with each other and downwardly convex configurations, as at 41a, with their margins extending upwardly and interiorly to terminate in interior peripheral edges 25a. The peripheral portions 41a and interior edges 25a correspond to hereinbefore described portions 41 and edges 25.

However, the container 10a of the modified embodiment of FIG. 4 is entirely without an inner support, holder or anything corresponding to the support or holder 12 of the first described embodiment. That is, an inner holder or support is not essential to satisfactory operation, particularly as the layers 11 and 11a are each entirely curved or nonflat, their curved surfaces combining with each other and contributing to an inherent strength, staunchness, sturdiness and stability which is achieved independently of an inner support. Of course, the thickness or gauge of material employed in each layer 11a is necessarily sufficient to achieve the desired self-sustaining condition when the outer layers 11a have been removed, and only a single or few layers remain in use. In all respects, except inclusion of a support or holder, the container 10a may be essentially identical to the first described container 10.

From the foregoing, it is seen that the present invention provides a sanitary container for repeated re-use, say as an oven roasting pan, a baking pan, a broiler pan, a pot dish or tray of any type, a dog or cat food dish or tray, an animal feeding or watering trough, pan or tub, a poultry feeding utensil, or any utensil for animals or humans.

Although the present invention has been described in some detail by way of illustration and example for purposes of clarity of understanding, it is understood that certain changes and modifications may be made within the spirit of the invention.

What is claimed is:

1. A sanitary pet-feeding container and the like for resting on a supporting surface and repeated re-use without cleaning, said container consisting essentially of a plurality of identical layers of thin sheet material in superposed congruent facing engagement with each other, each of said layers except the outermost layer having its surface exposed in use completely covered by the next adjacent outer layer and exposed for use by removal of the next adjacent outer layers, and said layers each including a recessed central layer portion combining with superposed recessed central portions to define a receptacle with the outermost recessed central layer portion providing the food supporting surface of the receptacle, an upper layer portion extending entirely about the upper peripheral region of each of said recessed central layer portions and transversely arcuately curved with the outermost layer presenting an upwardly and outwardly convex surface, an outer circumferential layer portion depending from each of said upper layer portions entirely about each of said layers with the outermost layer presenting an outwardly facing circumferential surface, said circumferential layer portions all depending to a level below the recessed central layer portion of the innermost layer, and an inturned circumferential lip extending entirely about each circumferential layer portion from the lower region thereof and transversely arcuately curved with the outermost layer presenting a downwardly convex surface for engagement with a support with its marginal edge extending upwardly and inwardly; all except the outermost layer being spaced from the support surface when the outermost layer has its inturned circumferential lip engaging the support surface, said food supporting, upwardly convex, circumferential and downwardly convex surfaces of each layer except the outermost being subject to contamination in use and protected from contamination prior to use by the next adjacent outer layer.

2. A sanitary container according to claim 1, said recessed central layer portions each including inwardly tapering side walls in frictional wedging engagement with the next adjacent layer.

3. A sanitary container according to claim 1, said recessed central layer portions each being in retaining engagement with the next adjacent layer by interface surface engagement.

4. A sanitary container according to claim 1, in combination with releasable adhesive means interposed between said superposed layers.

5. A sanitary container according to claim 4, said adhesive means being releasable from the recess of each layer and adherent to the nonrecessed surface of each layer.

6. A sanitary container according to claim 1, said layers being fabricated of metal foil.

7. A sanitary container according to claim 1, said layers being self-sustaining in position on a supporting surface and carrying contents upon removal of successive adjacent outer layers.

* * * * *